United States Patent [19]

Sibley

[11] 4,234,870
[45] Nov. 18, 1980

[54] VITAL ELECTRONIC CODE GENERATOR

[75] Inventor: Henry C. Sibley, Adams Basin, N.Y.

[73] Assignee: General Signal Corporation, Rochester, N.Y.

[21] Appl. No.: 2,765

[22] Filed: Jan. 11, 1979

[51] Int. Cl.³ .................... G08G 25/00; G06F 11/30; H04L 1/14
[52] U.S. Cl. .............................. 340/348; 246/167 R; 340/350; 371/34; 371/67
[58] Field of Search ............... 340/348, 351, 345, 356, 340/350, 354, 47, 146.1 A, 146.1 BA, 146.1 BE; 178/79; 246/175, 167 R, 28 F, 182 B; 364/717; 328/60; 371/30, 31, 34, 37, 48, 62, 67, 71, 69

[56] References Cited

U.S. PATENT DOCUMENTS

| 3,445,591 | 5/1969 | Koehler et al. ...................... 340/345 |
| 3,646,518 | 2/1972 | Weinstein ................... 340/146.1 BA |
| 3,840,855 | 10/1974 | Ameau et al. ............. 340/146.1 BE |
| 3,885,228 | 5/1975 | Katz et al. ............................. 340/47 |
| 4,107,253 | 8/1978 | Borg et al. ................. 340/146.1 BA |

Primary Examiner—John W. Caldwell, Sr.
Assistant Examiner—James J. Groody
Attorney, Agent, or Firm—Oblon, Fisher, Spivak, McClelland & Maier

[57] ABSTRACT

A code generator including a programmed microprocessor for transmitting a selected fixed frequenccy signal through optical isolators to tuned vital relay drivers. Feedback information from these drivers monitors their operation and checks operation of output circuitry. External time delays are provided to check program delays within the system and to ensure against the generation of erroneous codes due to cyclical resetting of the system. A rate selector is provided to permit selection of particular output code rates and is cycle checked continuously to ensure that the system is always certain of the selected code. Unique programming functions are also provided for self checking and for checking the operation of the microprocessor against the operation of external components to provide total system integrity and total system reliability. Diversity and cycle checking are used throughout the system to provide vital qualities. The system has no failure bias and is entirely self checking. Any component or program failure or malfunction causes the system to shut down completely.

15 Claims, 4 Drawing Figures

VITAL ELECTRONIC CODE GENERATOR

BACKGROUND OF THE INVENTION

1. Field of the Invention

The present invention relates to an electronic code rate generator, and more particularly to an electronic code rate generator designed for applications in which fail-safe qualities are desirable or required.

2. Description of the Prior Art

In a number of industrial applications, such as railroad technology, code generators are commonly used to transmit information. In the railway signalling and control field, for example, vehicle speed, application of motor and braking power, indicator lights aboard the vehicle and other functions may be controlled either automatically or manually in response to coded information transmitted from wayside stations. This coded information normally takes the form of variable low frequency pulse rates. Since human lives often depend upon safe operation of the vehicles, and since vehicle safety corresponds to accurate and reliable operation of the code generators, railway control systems are typically required to exhibit fail-safe or "vital" qualities. One aspect of this fail-safe or "vital" requirement is that any failures which could occur in the equipment must result in a condition which is no more dangerous than if the equipment had not failed.

In previously available equipment, code rate generators have often taken the form of mechanical relays which tended to fail to a slower rate. They were used in a way such that if a failure occurred and the code generator transmitted at a lower rate, a slower speed, or other similarly safer condition would be indicated. However, this biasing toward slower rate failure is often undesirable because it may not be immediately clear that the system has in fact failed, causing potentially economically damaging transportation delays as well as delays in detecting and locating the failed components. Furthermore, mechanical components are subject to mechanical wear and are presently becoming more and more expensive relative to electronic components.

There is accordingly a significant interest in using electronic components for code generating functions. However, many of those skilled in the railway signalling arts are reluctant to switch to electronic components because they are not yet proven with respect to their fail-safe or "vital" qualities and are often thought to possess unknown failure modes. At least one fail-safe electronic code rate generator is presently known and is disclosed in U.S. Pat. No. 4,053,879, issued Oct. 11, 1977, to Robert Anderson and assigned to the same assignee as the present application.

SUMMARY OF THE INVENTION

Accordingly, one object of the present invention is to provide a novel vital code generator in which any system failure would cause complete system shut down.

Another object of the present invention is the provision of a novel electronic code rate generator which is rendered fail-safe by a plurality of self-checking features.

A still further object of the present invention is the provision of a novel microprocessor based vital code generator which includes both diversity and cycle checking features to prevent code rate errors.

A still further object of the present invention is the provision of a novel technique for producing a fully vital electronic code transmitter.

Another object of the present invention is the provision of a vital code rate generator which includes both unique programming functions and hard-wired circuit components which are checked against one another to ensure against code rate errors.

A still further object of the present invention is the provision of a code rate generator including a programmed microprocessor which shuts itself down entirely if code rate errors are detected.

Briefly, these and other objects of the present invention are attained by the provision of a programmed microprocessor which transmits a fixed frequency signal through optical isolators to tuned vital relay drivers. Feedback information from these drivers monitors their operation and checks operation of the output circuitry. External time delays are provided to check program delay within the system and to ensure against the generation of the erroneous codes due to cyclical resetting of the system. A variable rate selector is also provided and is cycle checked continuously to ensure that the system is always certain of the selected code. In addition, unique programming functions are provided for self checking and for checking the operation of the microprocessor against the operation of external components to ensure total system integrity and total system reliability. Diversity and cycle checking are used throughout the system to provide vital operation.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1A:
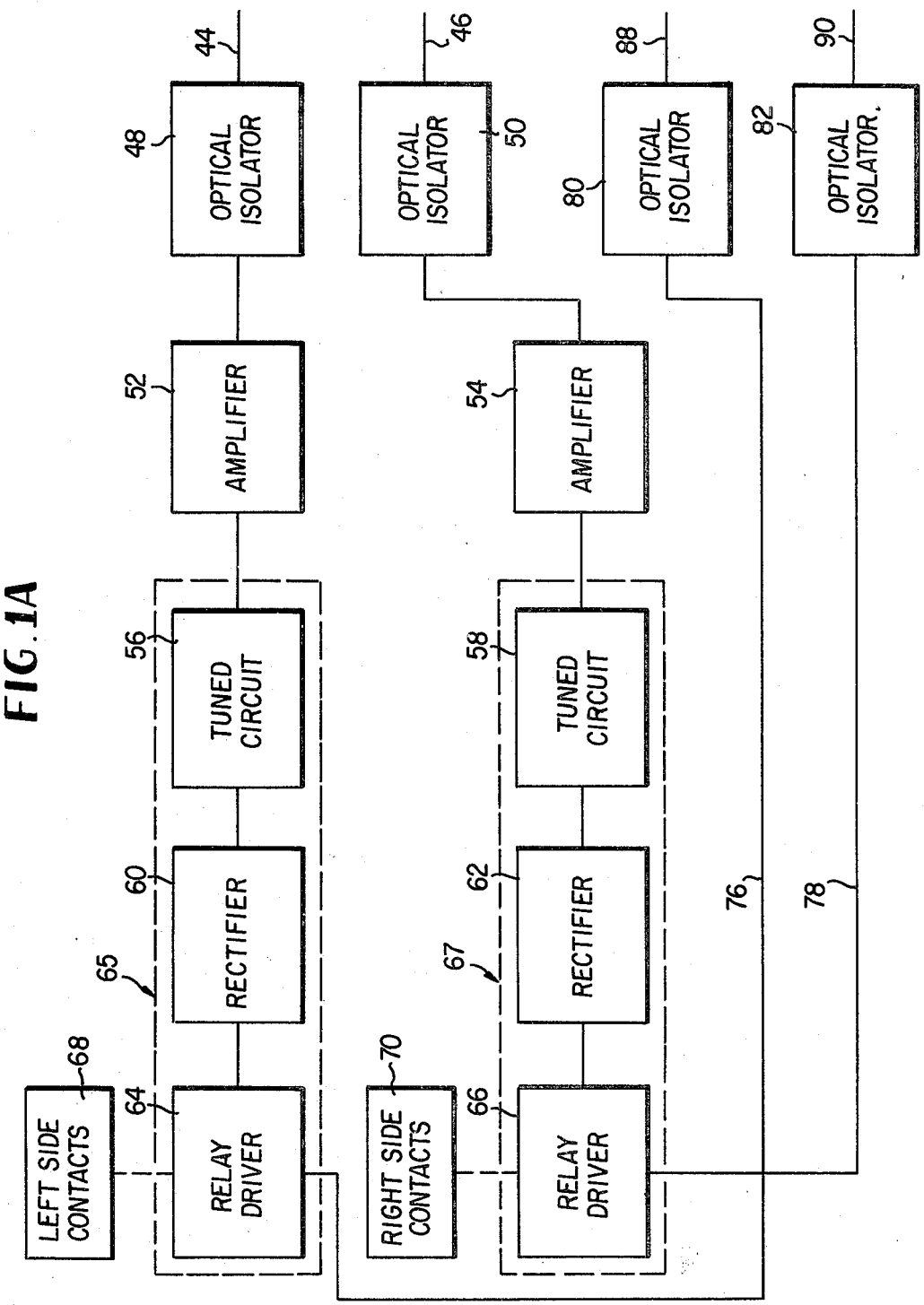
FIGS. 1A and 1B together form a block diagram showing in schematic form the components of the present invention.
Figure 1B:
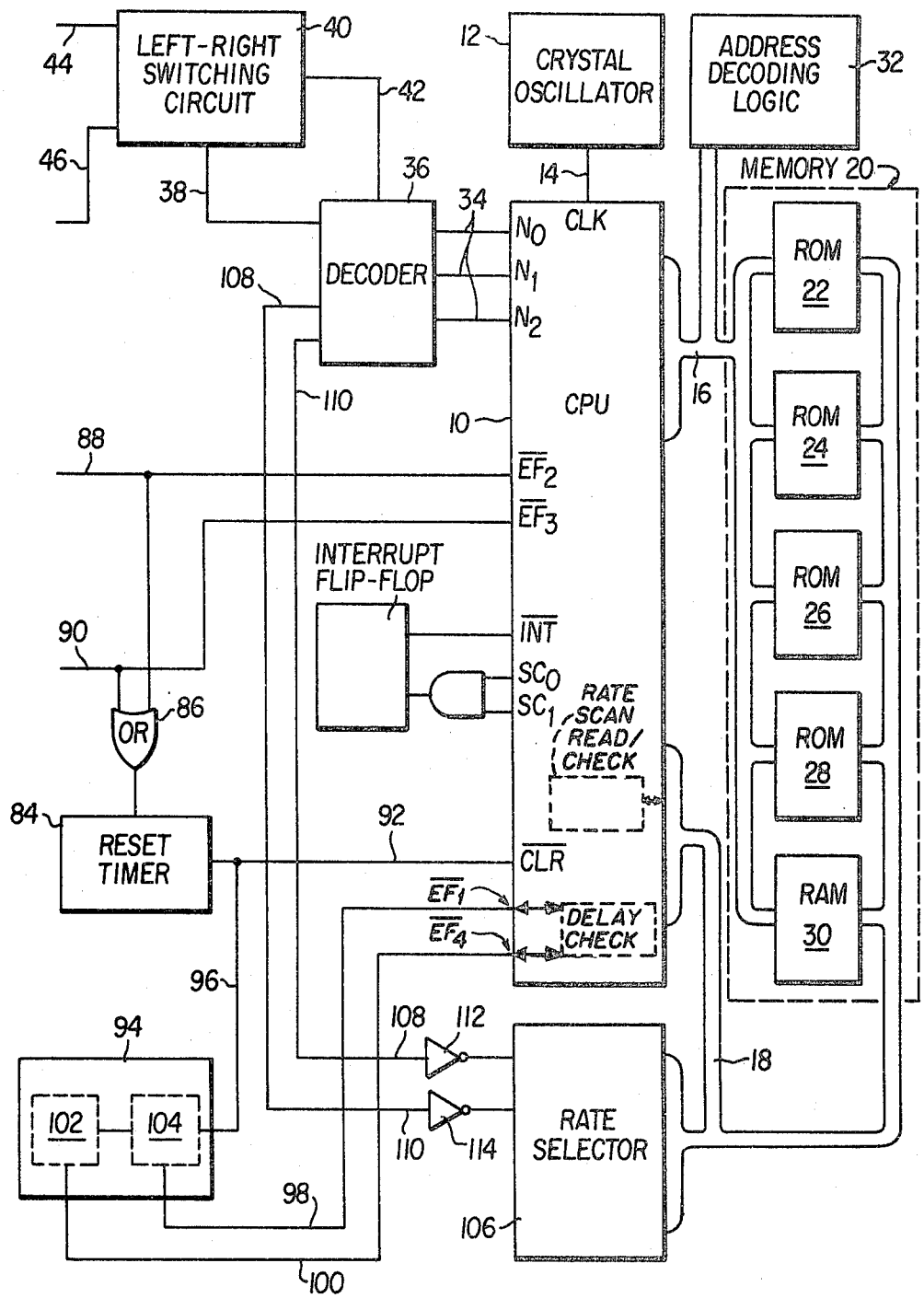

Referring now to the drawings, wherein like reference numerals designate identical or corresponding parts throughout the several views, and more particularly to FIG. 1 thereof, a block diagram of the vital electronic code generator is the Central Processing Unit (CPU) 10 which may be any suitable commercially available microprocessor, such as an RCA Cosmac 1802. As is well known to those skilled in the art, a microprocessor is a sophisticated electronic component which is capable of performing logic operations far more complex than simple code generation. However, in many industries, such as the railroad industry, it is of utmost importance that information transmitted by code by absolutely free of errors. This need for error-free code generation will be apparent when one considers the potential danger that could occur if a movable train is fed incorrect speed or traffic information due to a code transmitter failure. As a result it is essential to provide the code transmitter with hard wired components as well as programming techniques which prevent erroneous codes from being generated. It is with these goals in mind that the present invention was conceived and designed. The present invention is designed to incorporate cycle checking, which is the continuous testing of a device, circuit or computer instruction to determine that it is completely functional, and diversity checking. Diversity checking involves the use of two or more independent channels to produce a permissive output, the channels being arranged so that a single disruptive event cannot cause identical failures in all channels, and all channels must agree before a permissive output is accepted. In addition the system of the invention is designed so that cycle and diversity checking concepts permit program components to check hard wired components and vice versa, providing a network of uniquely integrated self-checking hardware and software components.

Turning again to FIG. 1B, it is noted that a conventional crystal oscilator 12 is coupled to the clock input of the CPU via a line 14 in order to provide a reliable clock frequency reference to the CPU. The CPU is coupled via a first data bus 16 and a second data bus 18 to a conventional memory 20. The memory is shown as including four interconnected read only memories (ROMs) 22-28 and a random access memory (RAM) 30. These memories are conventional devices well known to those skilled in the art and the particular interconnection of memory components and the utilization of particular components is well within the ordinary capabilities of those skilled in the art of digital signal processing. Conventional address decoding logic 32 is coupled to the first data bus 16 to provide the normal decoding logic function necessary in any digital circuit employing a memory network. Programs which will be described in detail subsequently are stored in the ROM network for controlling the sequencing, testing and output of the CPU, as is well known to those skilled in the art.

The outputs of the CPU 10 are delivered through three output control lines 34 connected to the $N_0$, $N_1$ and $N_2$ terminals of the CPU. These outputs are delivered to a conventional decoder 36 which in turn has a main output line 38 for supplying the decoded output of the CPU to a left-right switching circuit 40. The left-right switching circuit 40 is a conventional electronic circuit in the nature of a flip flop which applies inputs received on input line 38 to either a left side output line 44 or a right side output line 46. Switching is controlled via a switching output line 42 coupled between the decoder 36 and left-right switching circuit 40. In operation, information on the output control lines 34 from the CPU 10 is encoded to contain both the information intended to be transmitted and information as to whether the coded signal is to be transmitted over the left or right output channels. This information is converted into an information signal and a switching control signal in the decoder 36 so that the left-right switching circuit is properly controlled whereby coded output information is applied to the proper output channel.

The left and right signal transmission channels coupled to the lines 44 and 46 are identical, each incorporating optical isolators 48, 50, amplifiers 52, 54; tuned circuits 56, 58; rectifiers 60, 62 and relay drivers 64, 66. The relay drivers 64 and 66 drive appropriate sets of contacts 68 and 70, respectively which are in turn coupled to an appropriate utilization device, such as a plug board or transmission line. The tuned circuits 56, 58, rectifiers 60, 62 and relay drivers 64, 66 together form a pair of vital tuned relay drivers 65 and 67. The tuned circuits 56, 58, rectifiers 60, 62 and relay drivers 64, 66 are selected to be conventional vital circuits, meaning that their reliability has already been proven by extensive testing and operational use.

The optical isolators 48 and 50 are used to separate the small signal digital logic circuits from the higher power relay drivers and related circuitry. Optical isolators are well known to those skilled in the art, and normally comprise a photodiode-phototransistor combination packaged in a commercially available unit. Isolators of this type are particularly useful in the railroad environment since the relay driving circuitry is often located in a somewhat hostile electrical environment which must tolerate radically different weather conditions, lightning strokes, and other substantial voltage transients. Although the relay driving circuitry is conventionally designed to withstand such hostile conditions, and is thus unaffected by them, it is necessary to isolate the more sensitive digital processing components of the system from these transients, as will be apparent to those skilled in the art.

Figure 2:
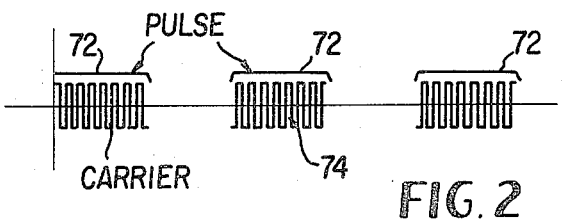
FIG. 2 is a graphical illustration showing the pulse and carrier configuration of the present invention; and, FIG. 3 is a detailed illustration of the code rate selector of the present invention.

The signals passed through the optical isolators are fed to suitable power amplifiers 52 and 54 of conventional structure. The outputs of the power amplifiers are applied to tuned circuits 56 and 58. The significance of the tuned circuits may be better understood by reference to FIG. 2 wherein the form of the transmitted code rate signals is illustrated in more detail. By way of background, it is common in the railroad industry to transmit information by coded pulses at relatively low frequencies (see U.S. Pat. No. 4,053,879). A series of such pulses is illustrated at 72 in FIG. 2. Each pulse is not simply a DC voltage, however, but is made up of a high frequency carrier signal as indicated at 74. The carrier signal may be set at any appropriate frequency based on the frequency of the crystal oscillator 12. The tuned circuits 56 and 58 are consequently tuned to transmit only signals at the carrier frequency 74 to reject all other signals. Accordingly, if the clock oscillator 12 changes frequency due to a malfunction, the tuned circuits would reject the new output signal, thereby preventing transmission of a signal which could possibly be misinterpreted by utilization equipment. It has been found suitable to design the tuned circuits to detect a code rate change in the carrier frequency of less than 8% at maximum power supply voltage.

Feedback lines 76 and 78 are connected to relay drivers 64 and 66, respectively and are coupled through optical isolators 80 and 82 to terminals $\overline{EF}_2$ and $\overline{EF}_3$ of the CPU 10. The optical isolators 80 and 82 are provided for the same purpose as isolators 48 and 50, previously described, and are preferably substantially identical to those isolators. The feedback network thusly provided monitors the operation of the relay drivers and feeds this information back to the CPU 10 so that it can be compared with the output signal. The feedback network thus provides a positive indication as to whether the relay drivers are following the generated output code and thus checks the entire transmission circuit between the decoder 36 and the relay drivers to determine if a malfunction has occurred. This comparison checking is carried out by means program instructions described in more detail subsequently.

A reset timer 84 is coupled at its input to an OR gate 86 which in turn receives inputs from lines 88 and 90 which are coupled between optical isolators 80 and 82 and CPU terminals $\overline{EF}_2$ and $\overline{EF}_3$. The output of the reset timer 84 is coupled via a line 92 to the $\overline{CLR}$ terminal of the CPU 10 and also to a delay timer 94. The reset timer 84 remains disabled as long as signals are applied over lines 88 and 90 through OR gate 86 to the input of the reset timer. If such input signals should stop for more than a predetermined interval of time, however, the reset timer generates an output over line 92 which resets the CPU 10. The purpose of the reset timer is to reset the CPU 10 if no activity occurs on the feedback line for a predetermined interval of time. If, for example, the CPU is temporarily rendered inoperative by noise or a program malfunction, the reset timer will be activated to clear and restart the CPU. The reset timer may, for example, be a conventional Model 555 Timer.

The delay timer 94 receives its input over line 96 from reset timer 84, as previously noted, and supplies two output signals over lines 98 and 100 to CPU terminals $\overline{EF}_1$ and $\overline{EF}_4$. The purpose of the delay timer is to prevent the occurrence of an output that appears to be an acceptable code, but which is in fact caused by cyclical resetting of the CPU at a relatively high frequency. For example, the CPU may develop either a programming or hardware malfunction which may cause it to actuate one or both of the relay drivers 64 and 66, and then require resetting via the reset timer 84. Once the system is reset, the relay drivers could again be actuated, followed by another resetting of the CPU. If this sequence happened to occur fast enough and at the proper frequency, the output of the relay drivers could appear to be an acceptable output code rate. To prevent this, the delay timer 94 is actuated each time the reset timer 84 acts to reset the CPU 10. The delay timer delays the restarting of the CPU long enough to prevent the cyclical resetting of the CPU from appearing as an acceptable output code. In practice this amounts to delaying the restarting of the CPU for a relatively long interval relative to the period of an acceptable code i.e., about two seconds.

The delay timer provides a very important function from the safety standpoint since it cooperates with the programming of the CPU to provide a diversity check on the operability of the system. It is noted that the $\overline{EF}_1$ and $\overline{EF}_4$ inputs of the CPU 10, to which the delay timer is coupled, are flag inputs and that the program continually checks these two flags to determine if it has approval to continue.

The delay timer 94 is preferably formed of two cascaded one-shot multivibrators 102 and 104 (E.G. RCA 14538 units) the first of which (102) is set by input signals on line 96. The first one-shot generates a 2 second delay and the second one-shot generates a short "window". Timing loops in the CPU program, discussed subsequently, produce a similar sequence. The second processor loop must end in the "window" in order for the CPU program to continue. A diversity check is therefore established between the delay timer 94 and the CPU software. The outputs on lines 98 and 100 alternate between 0-1 and 1-0 combinations. By checking the flag inputs $\overline{EF}_1$ and $\overline{EF}_4$ during the program sequence, the flags should indicate alternating 0-1 and 1-0 inputs. If one of the one-shot multivibrators fails or produces an incorrect output, the malfunction would be detected by noting incorrect flag inputs or flag inputs which do not follow the required sequencing. This feature provides another checking technique for ensuring that the delay timer circuitry remains operative.

Figure 3:
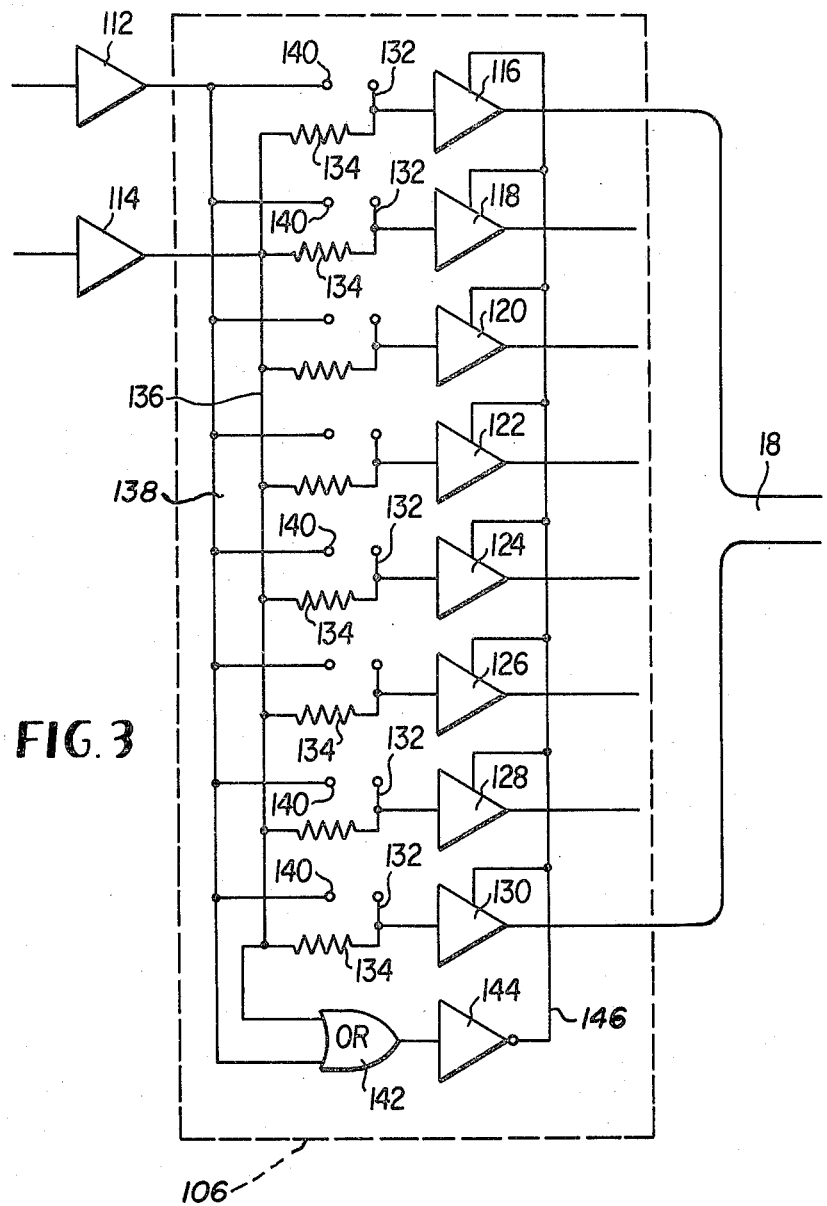

In the railroad industry, as well as in other technical fields, it is common to use a number of different code rates for transmitting different types of information. Accordingly, the system of the present invention is provided with a code rate selector 106 so that the system can be set to generate different code rates. The code rate selector 106, the details of which are shown in FIG. 3, receives scanning inputs via lines 108 and 110 from decoder 36. These inputs are applied through conventional inverters 112 and 114 to read the selected code rate and output signals carrying the selected code rate information are coupled via data bus 18 to the CPU 10 for decoding, as will be explained in more detail subsequently.

Referring now to FIG. 3, the rate selector is shown as including a plurality of buffers 116–130. Each of these buffers includes an input 132 having two terminals. One of these terminals is normally left open circuited while the other is coupled by means of a resistor 134 to a line 136 which is also coupled to the output of inverter 114. A second line 138 is coupled to the output of inverter 112 and includes a series of jumper terminals 140 which are positioned to be short circuited directly to the input terminals 132 of one of the buffers 116–130. Rate selection is achieved by placing a jumper across one of the terminals 140 to connect it with one of the terminals 132. It is further noted that the lines 136 and 138 are coupled to the input of an OR gate 142, the output of which is applied through an inverter 144 to a line 146 which is coupled to each of the buffers 116–130 to enable the buffers. The outputs of all of the buffers are coupled by data bus 18 to appropriate decoding inputs of the CPU 10.

The operation of the rate selection circuit is as follows. First, an appropriate rate is selected by placing a jumper across an appropriate one of the pairs of terminals 140 and 132. Once a rate is thus selected, it is very important that the CPU correctly read this rate, and that the selected rate should not change (or appear to change) due to some malfunction in the rate selection circuit. Accordingly, it is necessary to cyclically test the rate selection circuit to make sure that the selected rate is unambiguously read by the CPU. To attain this goal, alternating one and zero checking signals are supplied from the decoder 36 over lines 108 and 110 to inverters 112 and 114. With this alteration in input signals, the output on bus 18 will alternatively be six zeros with a single one indicating the position of the selected code and six ones with a zero indicating the position of the selected code. This information is fed to the CPU where the position of the selected code is continuously monitored. A failure in any of the circuit components will be detected if the proper alteration in the detected code indication fails to occur or if additional ones or zeros occur. In this case, the program is arranged to shut down the operation of the system.

PROGRAMMING

The task of generating time intervals for rate code transmission of the type contemplated by the present invention is a relatively simple one for a computer or microprocessor of the type previously referred to in the present specification. In the simplest case, fewer than a dozen instructions would be required to generate timing intervals: (1) a number is loaded into a register, (2) an instruction loop is provided which decrements that number and (3) the steps are repeated until the number is reduced to zero. The size of the number, the number of instructions in the loop and the cycle time of the microprocessor determines the time interval. However, it is easy to visualize how this simple program might generate incorrect time intervals. For example, the wrong number might be loaded, the register might not decrement correctly and the computer cycle time may change because of a clock failure. These and any other types of failures that might occur in such a system would generate incorrect outputs and would render the programmed device unsuitable and unsafe for use in the railway industry. However, since a microprocessor can perform logic operations at very high speed and can be directed to perform different operations simply by including more program instructions, the system of the present invention can be upgraded using various types of self-checking techniques, including diversity and cycle checking as previously mentioned, to raise it to the vital or fail safe standards of the railway signal industry. This approach is taken in the programming of the present invention. The program includes safety features at a number of critical points to both check the operation of the programming logic itself, and to compare the operation of the programming logic with external hard wired circuitry shown in FIG. 1 to insure that all components of the system are functioning according to their intended modes.

The system of the invention utilizes two programs, a time interval or timing program and a control or general system program. Attention will first be directed to the timing program, the details of which may be better understood by reference to Table 1 wherein the essential logical steps of the program are set out schematically in flowchart format.

In the time interval generation according to the programming approach of the present invention, two registers are used and these are loaded with numbers which are different but which bear a definite relationship to each other. The two registers are decremented by separate sets of instructions and at each step of the decrementing process the values of the registers are checked against their previous values and against each other to determine that the process is operating correctly. The instructions that test the relationships of the register contents are also cycle-checked continuously. Multiple exits are used in the timing program and these exit instructions are all tested at the beginning and end of each code half cycle.

In explanation of the timing program, it is pointed out that two-byte numbers T+,t+ and T, t reside in 16-byte registers that can be decremented. The values of these numbers are selected to provide the desired time at which they are to be decremented to zero. Initially, T+, t+ is specified to be equal to (T, t)+1.

TABLE 1

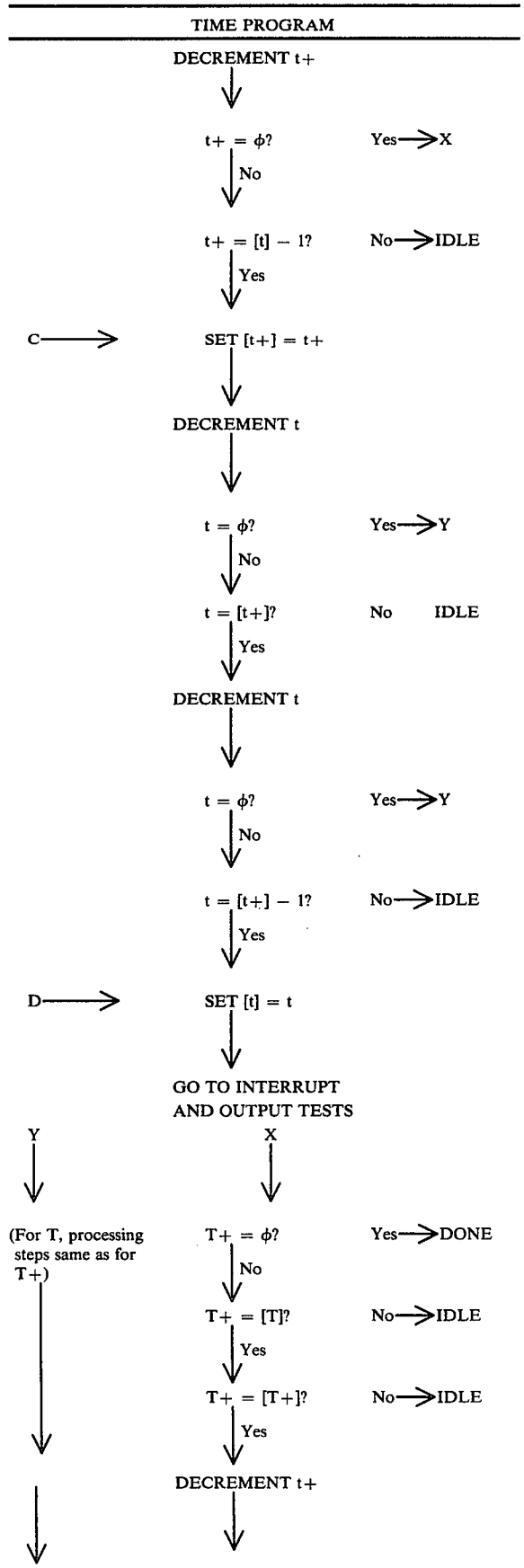

TABLE 1-continued
TIME PROGRAM

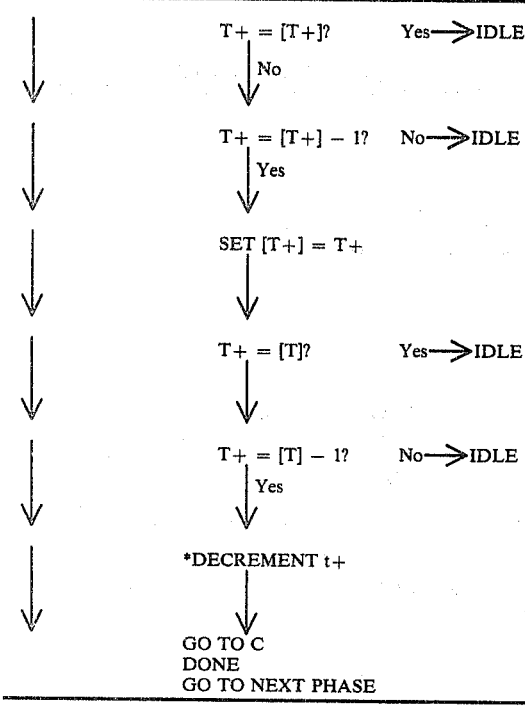

GO TO C
DONE
GO TO NEXT PHASE

*t+ must be decremented before returning to t+ part of time program to compensate for the effect on t+ due to the branch to A.

Duplicates of these numbers are stored in RAM 30 and are designated [T+], [t+] and [T], [t]. Since the microprocessor 10 does not provide arithmetic operations on registers, these duplicate values are required.

The program decrements these numbers to generate the desired time intervals. The decrementing procedure is checked by testing the values in the registers against the values in memory at every step.

Set and reset instructions spaced evenly through this program toggle a flip-flop to generate a fixed frequency signal during the time interval. This fixed frequency signal is the signal to which the previously described circuits 56 and 58 are tuned. As previously mentioned, the tuned circuits permit only signals of the proper frequency to energize the relay drivers 64 and 66 to operate the contact 68 and 70. Thus the tuned circuits 56 and 58, operating in conjunction with the timing program instructions, assure that the crystal oscillator 12 is operating at the correct frequency and therefore that the timed intervals generated by the timing program are correct. This is a form of diversity checking within the present invention.

It is noted that the arrangement of the time program is such that if some inconsistency occurs or if any of the checks fails to show proper operation of the system, the timing program stops and the operation of the system comes to a halt. It can be seen from the previous discussion and by reference to Table 1 showing the timing program that the extensive checking within the program combined with the diversity checking through the use of the tuned circuits in the output network render the timing program vital or failsafe as required by the railroad industry.

The timing program is, of course, an essential aspect of the programming of the present invention. However, the timing program falls under the control of the overall system program which is illustrated in schematic or flowchart form in Table 2. The system program employs cycle checking and diversity throughout to ensure vital or fail-safe operation. Tests are made at critical program steps and these tests are verified by cycle checking the test instructions. If a test condition is not satisfied, the processor goes into the idle state and must be given an external clear input to resume operation.

The program responds to an external clear input by generating a delay of two seconds. This delay ensures that if a vital test is failed, repeated restarting of the program cannot produce an output at the rate of a valid code. The delay is made vital by comparing it to the delay of timer 94 and the two one shots 102 and 104 contained therein. These two one shots, the operation of which has already been partially described, are in effect precision timers in cascade. The first one shot 102 generates a delay of slightly less than two seconds and the second one shot 104 generates a short window which defines the time when the program generated delay must be completed. The states of these one shots, which alternate between 0-1 and 1-0 combinations as previously mentioned, are tested continuously during the running of the delay program and if they are not correct, the processor goes into the idle state.

Whenever the program is started or restarts, all registers used in the vital timing program are cleared and tested. The exit instructions in the vital timing program are also tested.

Code rate selection is also carefully checked by the program, since a misreading of, or malfunction in the code selector 106 could have very serious consequences. As mentioned previously, any one of seven code rates may be made by positioning a jumper across one of the sets of terminals 132-140 in the code rate selector illustrated in FIG. 3. Once a jumper is firmly in position, a particular code is selected and this code is read by the program. To guard against failures in the rate input circuit and resultant false outputs, the rate input jumper is tested twice by complementary scanning signals applied via lines 108 and 110. These two tests produce complementary outputs from the code selector 106 and these are applied via bus 18 to CPU 10 as a single one and six zeros and a single zero and six ones. Separate program segments process these inputs to produce separate memory addresses.

TABLE 2
SYSTEM PROGRAM

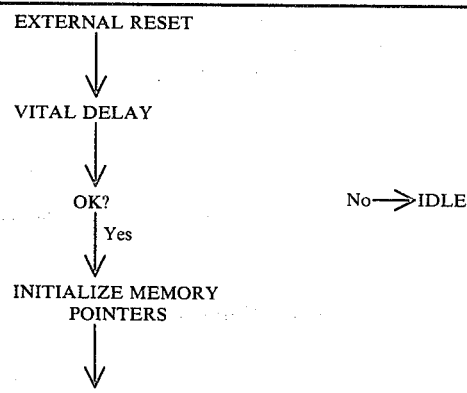

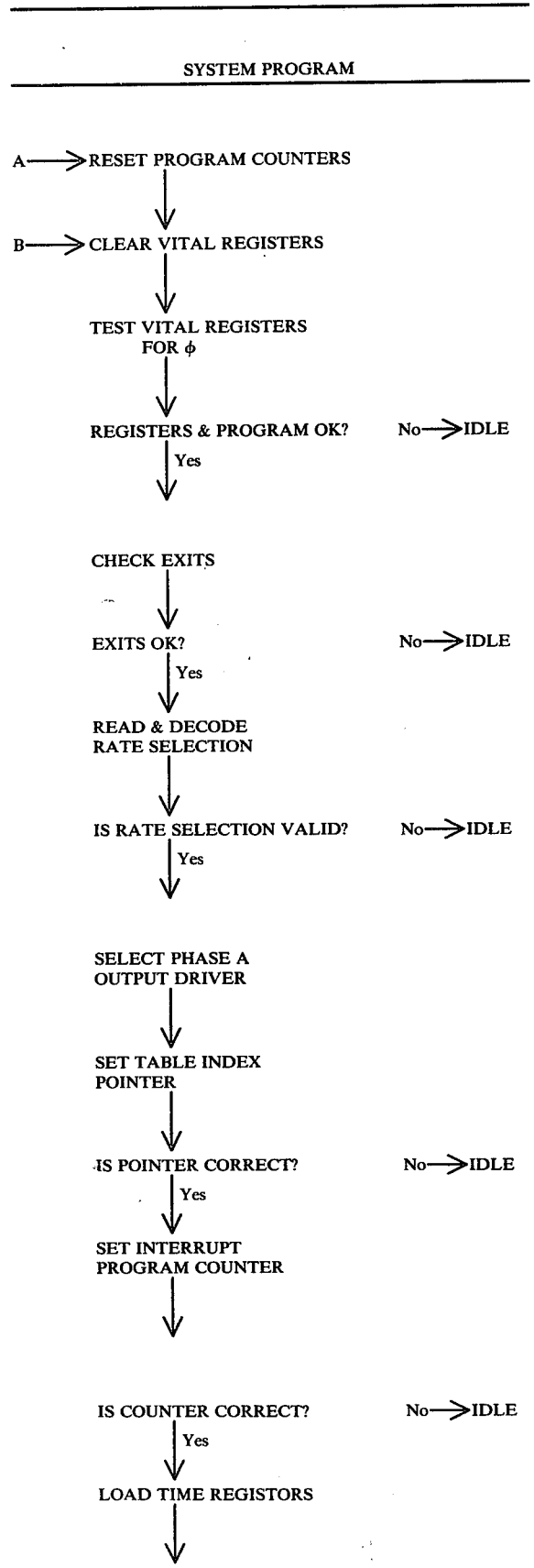
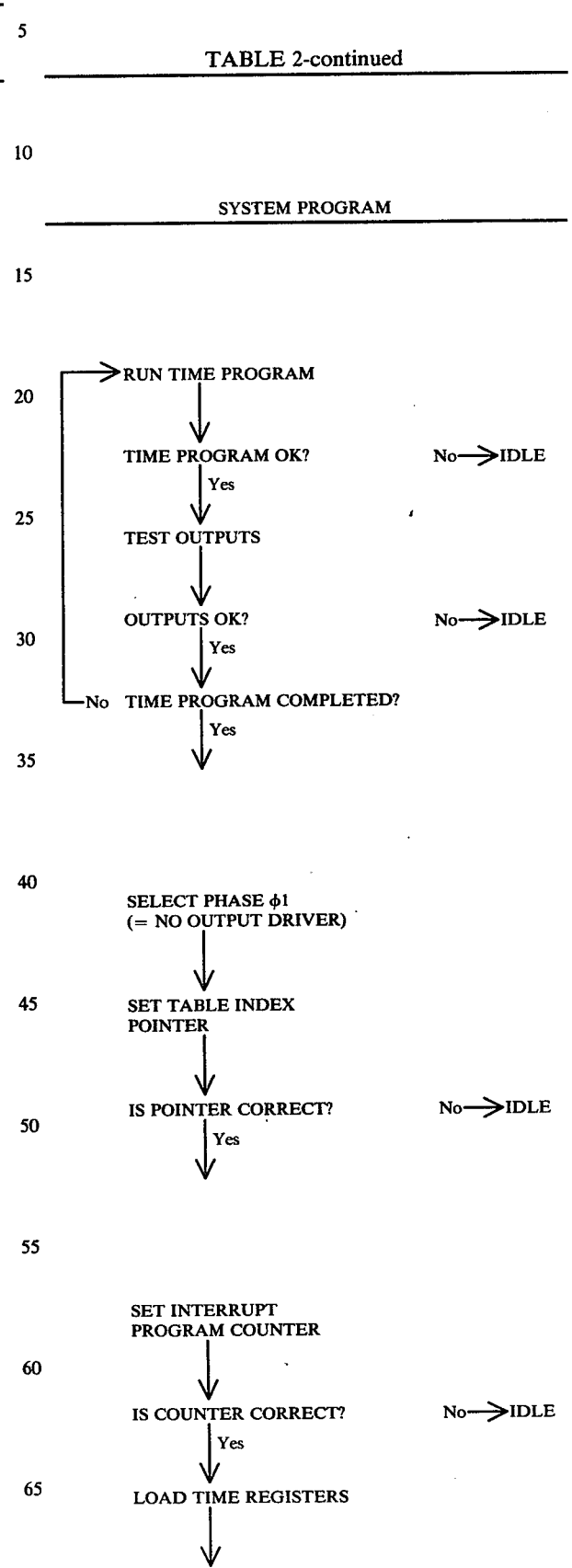

TABLE 2-continued
SYSTEM PROGRAM

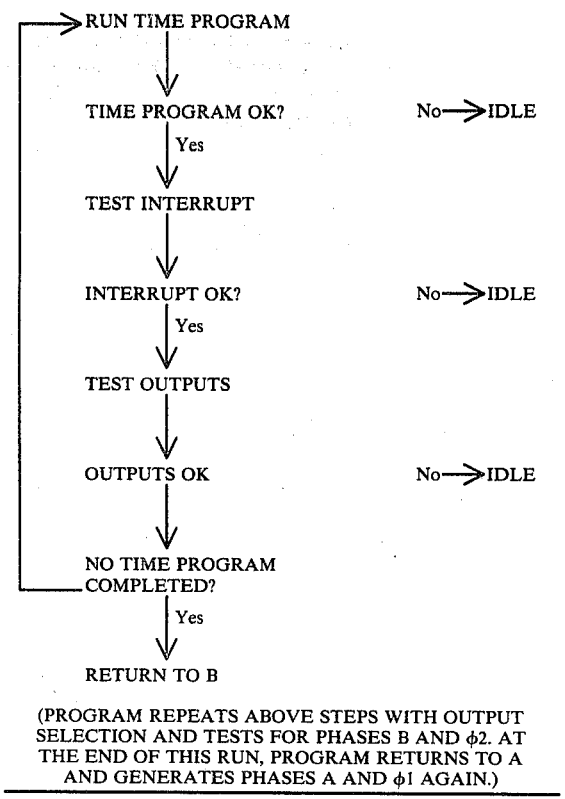

(PROGRAM REPEATS ABOVE STEPS WITH OUTPUT SELECTION AND TESTS FOR PHASES B AND φ2. AT THE END OF THIS RUN, PROGRAM RETURNS TO A AND GENERATES PHASES A AND φ1 AGAIN.)

These memory addresses are used to obtain the proper T+, t+ and T, t values for the time program. Any lack of correspondence will result in the time program not running and the processor immediately defaulting to the idle state. Also included in the rate input program are checks for no rate selection jumper and more than one jumper.

As pointed out previously, the rate selector is scanned via lines 108 and 110 with complementary inputs. The resulting outputs are used to obtain values from a stored table to be used in the time interval program. The direct number accesses one part of the table and the complement number accesses another part. This feature is another use of diversity within the system of the invention. The two numbers must be read correctly or the table values will not bear the definite relationship to each other which is necessary for the time program to run. The code rate selection thus checked is read into the processor after each code rate half cycle, and the program cannot continue unless the code rate selection is continuously updated by this reading. Several stored table values are of course required to generate each rate, on-time, off-time, most and least significant byte, and other values. These values are obtained by indexing the table pointer and each change in index is tested by program steps.

Throughout each code cycle the output of the processor must be switched to operate right (phase A), left (phase B) or no contacts (phase $O_1$ and $O_2$). The outputs of the vital drivers 65,67 are checked after each pass through the time program, approximately every 400 micro-seconds. Since each of the vital drivers 65,67 are switched on and off during each code cycle, the circuitry and program used in this test are cycle-checked.

The "on" phases are tested continuously by causing the processor to be interrupted by the start of an "off" phase. If an interrupt occurs any time during an "on" phase, the processor goes into the idle state. At the start of each "off" state, the interrupt must respond to allow the program to continue. At the end of each "on" and "off" phase, the program branches back to clear and test the vital registers within the CPU 10, test the time program exits and read the code selection inputs.

Outputs are monitored continuously while the time interval program is running. Any departure from the correct output, for example, left relay driven, right relay not driven, will cause the processor to halt. Once during each code cycle, the parts of the processor hardware and program required to detect intermittent outputs are cycle checked. If the processor is halted for any reason, the vitally checked startup delay timer 94 prevents generation of an output for at least two seconds.

To guard against the possibility of a routine being skipped, program counters for critical routines are not initialized until the necessary prior routine has been completed. Attempted entry to a routine at the wrong time will cause the processor to halt.

The general programming of a microprocessor of the type utilized in accordance with the present invention, is of course routine and well within the capabilities of those skilled in the art. However, the concepts of the various checking schemes and techniques disclosed above are considered to be unique to the present invention. The implementation of these schemes and the actual preparation of a working program are considered to be well within ordinary skill in the art.

Obviously, numerous additional modifications and variations of the present invention are possible in light of the above teachings. It is therefore to be understood that within the scope of the appended claims, the invention may be practiced otherwise than as specifically described herein.

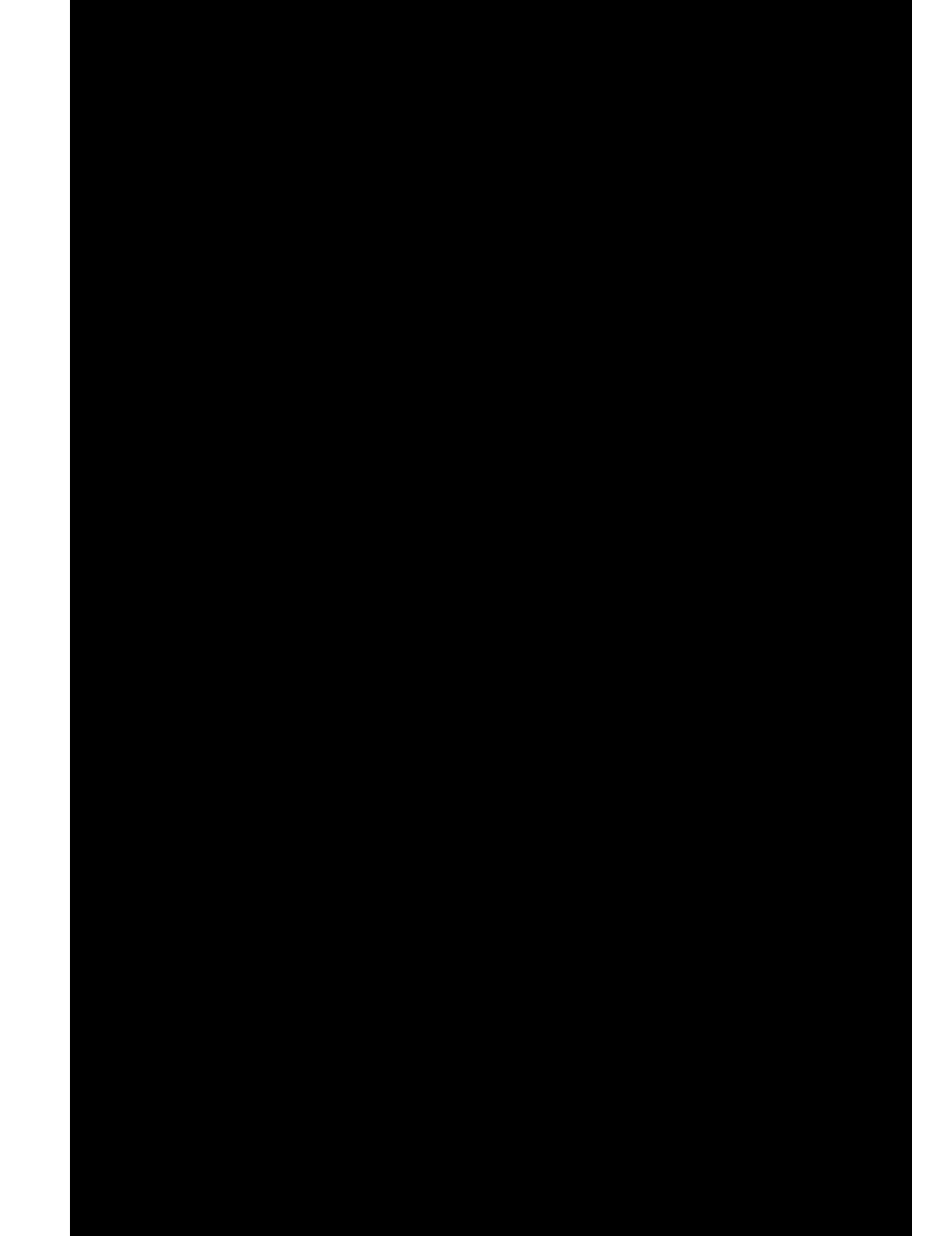

What is claimed as new and desired to be secured by Letters Patent of the United States is:

1. A vital electronic code generator comprising:
   a programmable central processing unit, said central processing including means for generating a signal at a selected code rate, said signal including pulses formed by a carrier signal of a given frequency,
   relay driving means for operating relay contacts, said relay driving means including circuit means tuned to said frequency of said carrier signal for discriminating against signals of other frequencies,
   output channel means for coupling said relay driving means to said central processing unit; and,
   feedback means coupled between said relay driving means and said central processing unit for comparing the activity of said relay driving means with the output of said central processing unit.

2. A vital electronic code generator as in claim 1, further comprising:
   reset timer means coupled to said feedback means and to said central processing unit for resetting said central processing unit a predetermined interval after activity on said feedback means ceases.

3. A vital electronic code generator as in claim 2, further comprising:
   delay timer means coupled to said central processing unit and to said reset timer means for preventing rapid, cyclical resetting of said central processing unit.